United States Patent
Liao (10) Patent No.: US 8,718,588 B2
(45) Date of Patent: May 6, 2014

(54) SIGNAL PROCESSING CIRCUIT HAVING MIXER UNITS USING OSCILLATION SIGNALS WITH DIFFERENT PHASES AND FREQUENCY-SELECTIVE COMBINING BLOCK FOR FREQUENCY-SELECTIVELY COMBINING OUTPUTS OF MIXER UNITS AND RELATED METHOD THEREOF

(75) Inventor: Chih-Fan Liao, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 49 days.

(21) Appl. No.: 13/483,072

(22) Filed: May 30, 2012

(65) Prior Publication Data

US 2013/0035053 A1    Feb. 7, 2013

Related U.S. Application Data

(60) Provisional application No. 61/514,984, filed on Aug. 4, 2011.

(51) Int. Cl.
*H04B 1/10* (2006.01)
*H04B 17/00* (2006.01)

(52) U.S. Cl.
USPC .......................................... 455/295; 375/346

(58) Field of Classification Search
USPC ......................... 455/295–306; 375/346, 349
See application file for complete search history.

(56) References Cited

U.S. PATENT DOCUMENTS

2009/0075612 A1 * 3/2009 Keehr et al. ................. 455/226.1
2011/0230152 A1   9/2011 Tsai

OTHER PUBLICATIONS

Lu, "A Saw-less GSM/GPRS/EDGE Receiver Embedded in a 65nm CMOS SoC", pp. 364-365 and a page including Figure 21.1.7, ISSCC 2011/Session 21/Cellular/21.1.
Mirzaei, "Analysis and Optimization of Current-Driven Passive Mixers in Narrowband Direct-Conversion Receivers", IEEE Journal of Solid-State Circuits, pp. 2678-2688, vol. 44, No. 10, Oct. 2009.
Darabi, "A Blocker Filtering Technique for SAW-Less Wireless Receivers", IEEE Journal of Solid-State Circuits, pp. 2766-2773, vol. 42, No. 12, Dec. 2007.

* cited by examiner

*Primary Examiner* — Lee Nguyen
(74) *Attorney, Agent, or Firm* — Winston Hsu; Scott Margo (57) ABSTRACT

A signal processing circuit is used for generating a signal output by processing a signal input, and includes a first mixer unit, a second mixer unit, and a frequency-selective combining block. The first mixer unit is arranged for receiving a first signal and a first oscillation signal, and generating a first mixing output by mixing the first oscillation signal and the first signal. The second mixer unit is arranged for receiving a second signal and a second oscillation signal, and generating a second mixing output by mixing the second oscillation signal and the second signal. Each of the first signal and the second signal is part of the signal input. The first and second oscillation signals have a same frequency but different phases. The frequency-selective combining block is arranged for frequency-selectively combining the first mixing output and the second mixing output to generate the signal output.

28 Claims, 7 Drawing Sheets

SIGNAL PROCESSING CIRCUIT HAVING MIXER UNITS USING OSCILLATION SIGNALS WITH DIFFERENT PHASES AND FREQUENCY-SELECTIVE COMBINING BLOCK FOR FREQUENCY-SELECTIVELY COMBINING OUTPUTS OF MIXER UNITS AND RELATED METHOD THEREOF

CROSS REFERENCE TO RELATED APPLICATIONS

This application claims the benefit of U.S. provisional application No. 61/514,984, filed on Aug. 4, 2011 and incorporated herein by reference.

BACKGROUND

The disclosed embodiments of the present invention relate to filtering out/reducing unwanted signal components present in a signal input, and more particularly, to a signal processing circuit having mixer units using oscillation signals with different phases (e.g., opposite phases) and a frequency-selective combining block for frequency-selectively combining outputs of the mixer units and related method thereof.

In general, a wireless communication receiver is required to have the capability of detecting weak signals in the desired frequency band. Specifically, the wireless communication receiver is required to detect in-band signals in the presence of very strong interference signals such as out-of-band (OOB) blocker signals. The most common solution to solving problems caused by very strong blocker signals is to use very high quality factor (Q) bandpass filters at the front-end of the wireless communication receiver. For example, surface acoustic wave (SAW) filters may be employed to offer the desired attenuation of OOB blocker signals. However, using SAW filters leads to significantly increased cost and circuit board area.

Thus, there is a need for an innovative design which can effectively attenuate or eliminate the unwanted signal components (e.g., OOB blocker signals) by using a simple circuit architecture.

SUMMARY

In accordance with exemplary embodiments of the present invention, a signal processing circuit having mixer units using oscillation signals with different phases (e.g., opposite phases) and a frequency-selective combining block for frequency-selectively combining outputs of the mixer units and related method thereof are proposed to solve the above-mentioned problem.

According to a first aspect of the present invention, an exemplary signal processing circuit for generating a signal output by processing a signal input is disclosed. The exemplary signal processing circuit includes a first mixer unit, a second mixer unit, and a frequency-selective combining block. The first mixer unit is arranged for receiving a first signal and a first oscillation signal, and generating a first mixing output by mixing the first oscillation signal and the first signal. The second mixer unit is arranged for receiving a second signal and a second oscillation signal, and generating a second mixing output by mixing the second oscillation signal and the second signal. Each of the first signal and the second signal is part of the signal input, and the first oscillation signal and the second oscillation signal have a same frequency but different phases. The frequency-selective combining block is arranged for frequency-selectively combining the first mixing output and the second mixing output to generate the signal output.

According to a second aspect of the present invention, an exemplary signal processing method for generating a signal output by processing a signal input is disclosed. The exemplary signal processing method includes: splitting the signal input to obtain a first signal and a second signal simultaneously; applying a first mixing operation to the first signal to generate a first mixing output; applying a second mixing operation to the second signal to generate a second mixing output, wherein the first mixing operation is different from the second mixing operation, and the first mixing output and the second mixing output have different phases; and frequency-selectively combining the first mixing output and the second mixing output to generate the signal output.

According to a third aspect of the present invention, an exemplary signal processing circuit is disclosed. The exemplary signal processing circuit includes a first mixer circuit, a blocker detection block, and a blocker cancellation block. The first mixer circuit is arranged for generating a first mixing output according to a first input. The blocker detection block is arranged for detecting characteristics of a blocker signal to generate a control output. The blocker cancellation block is arranged to support a plurality of candidate blocker cancellation configurations used to apply different blocker cancellations to the first mixing output, and employ one of the candidate blocker cancellation configurations according to the control output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

The present invention proposes a signal processing circuit which is capable of creating a signal component with an opposite phase for reducing or cancelling the undesired signal component present in a signal input. By way of example, the signal processing circuit may be employed in a SAW-less receiver for blocker cancellation. However, this is not meant to be a limitation of the present invention. Any application using any of the signal processing circuits proposed hereinafter for attenuating or eliminating unwanted signal components falls within the scope of the present invention. Details of the signal processing circuit are described as below.

Figure 1:
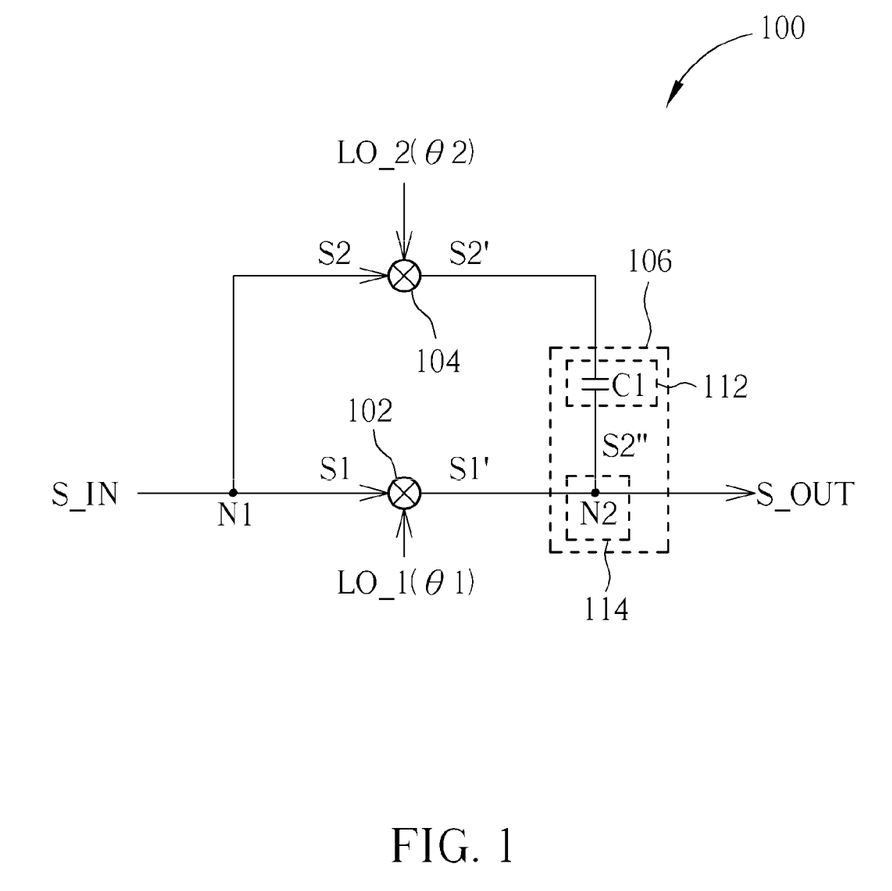
FIG. 1 is a diagram illustrating a signal processing circuit according to a first exemplary embodiment of the present invention.

FIG. 1 is a diagram illustrating a signal processing circuit according to a first exemplary embodiment of the present invention. The signal processing circuit 100 includes, but is not limited to, a first mixer unit 102, a second mixer unit 104, and a frequency-selective combining block 106. The first mixer unit 102 is arranged for receiving a first signal S1 and a first oscillation signal LO_1, and generating a first mixing output S1' by mixing the first oscillation signal LO_1 and the first signal S1. The second mixer unit 104 is arranged for receiving a second signal S2 and a second oscillation signal LO_2, and generating a second mixing output S2' by mixing the second oscillation signal LO_2 and the second signal S2. As shown in FIG. 1, the first mixer unit 102 and the second mixer unit 104 are coupled to the same signal input S_IN at an interconnection node N1. Hence, each of the first signal S1 and the second signal S2 is part of the signal input S_IN. In other words, the first signal S1 and the second signal S2 are derived from splitting the signal input S_IN. In addition, the first oscillation signal LO_1 and the second oscillation signal LO_2 have the same frequency but different phases θ1 and θ2 (i.e., θ1≠θ2), resulting in the first mixing output S1' and the second mixing output S2' having different phases. For example, in one exemplary design, the first oscillation signal LO_1 and the second oscillation signal LO_2 are designed to have a 180-degree phase difference therebetween, thus making the first mixing output S1' and the second mixing output S2' have opposite phases. By way of example, the first mixer unit 102 and the second mixer unit 104 may be implemented using transistors having gate terminals used to receive the oscillation signals. As a person skilled in art should readily understand the transistor-based implementation of the mixer, further description is omitted here for brevity.

Regarding the frequency-selective combining block 106, it is arranged for frequency-selectively combining the first mixing output S1' and the second mixing output S2' to generate the signal output S_OUT. In this exemplary embodiment, the frequency-selective combining block 106 includes a capacitive component 112 implemented using a capacitor C1 and a combining unit 114 implemented using an interconnection node N2. The capacitive component 112 is arranged for generating a frequency-selective output S2" according to the second mixing output S2'. The combining unit 114 is arranged for combining the frequency-selective output S2" and the first mixing output S1' to generate the signal output S_OUT.

Figure 2:
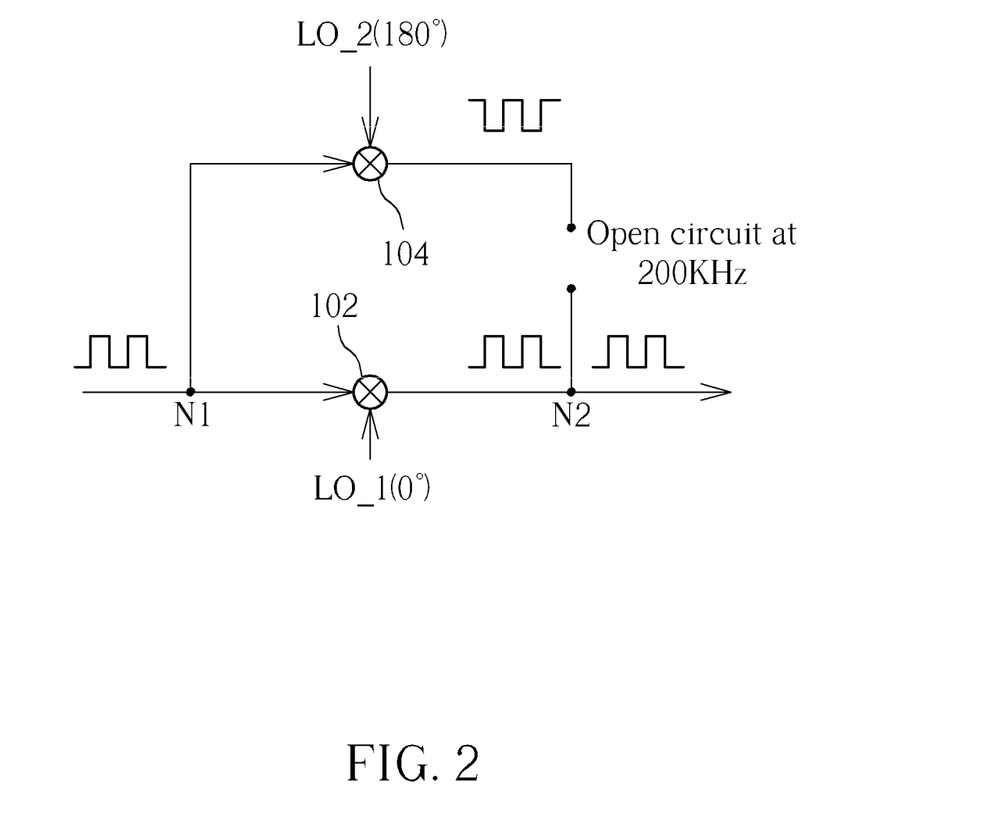
FIG. 2 is a diagram illustrating the processing of signal components located within a desired frequency band.
Figure 3:
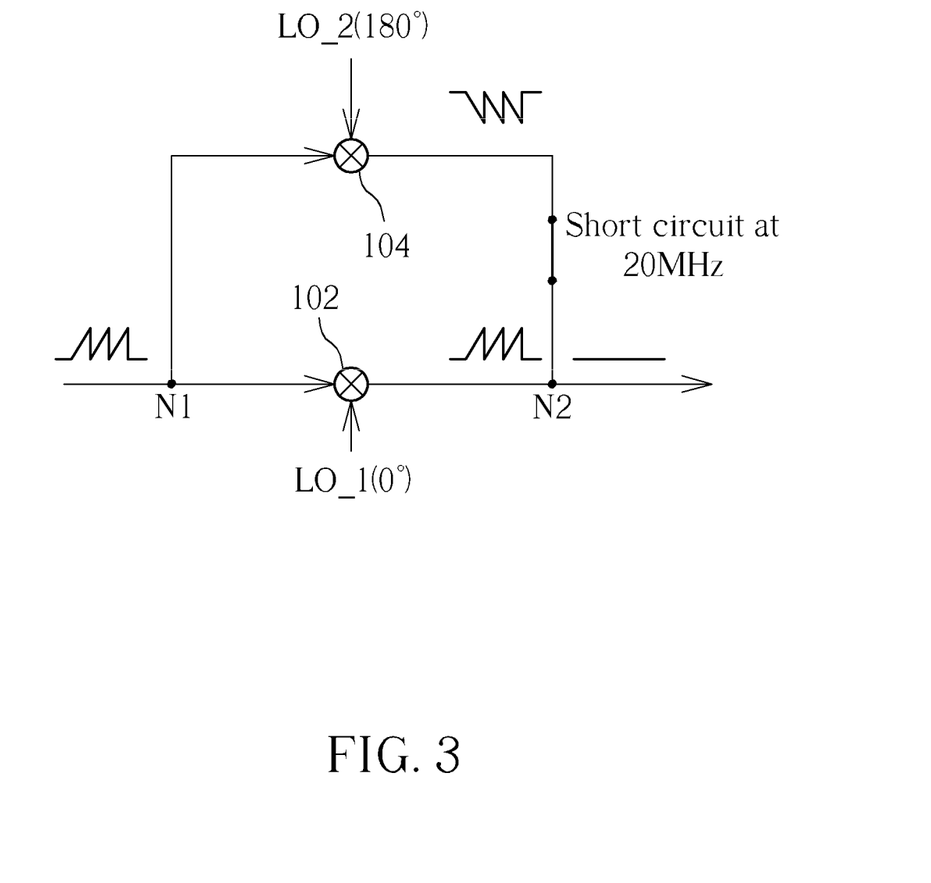
FIG. 3 is a diagram illustrating the processing of signal components located outside of the desired frequency band.

The operation of the signal processing circuit 100 is detailed with reference to the accompanying FIG. 2 and FIG. 3. FIG. 2 is a diagram illustrating the processing of the signal components located within a desired frequency band. FIG. 3 is a diagram illustrating the processing of the signal components located outside of the desired frequency band. Suppose that the phase of the first oscillation signal LO_1 is 0°, and the phase of the second oscillation signal LO_2 is 180°. Therefore, the first mixing output S1' and the second mixing output S2' are in an anti-phase condition. That is, the first mixing output S1' and the second mixing output S2' have a 180-degree phase difference therebetween. Consider an exemplary case where the wanted signal component present at a mixer output is located at an intermediate frequency (IF) of 200 kHz, and the unwanted signal component (e.g., the OOB blocker signal) present at a mixer output is located at another intermediate frequency (e.g., 20 MHz) that is higher than 200 kHz. Therefore, regarding the wanted signal component having the intermediate frequency of 200 kHz, the capacitive component 112 implemented using the capacitor C1 with a properly set capacitance value would act as an open circuit due to large equivalent impedance viewed by the 200 kHz IF mixer output. On the contrary, regarding the unwanted signal component having the intermediate frequency of 20 MHz, the capacitive component 112 implemented using the capacitor C1 with the properly set capacitance value would act as a short circuit due to small equivalent impedance viewed by the 20 MHz IF mixer output. As can be seen from FIG. 2, with regard to the in-band wanted signal, the mixer output of the second mixer unit 104 has no impact on the mixer output of the first mixer unit 102. Therefore, the wanted signal component in the signal input S_IN is down-converted by the first mixer unit 102 and then included in the signal output S_OUT transmitted to the following circuit stage. Besides, as can be seen from FIG. 3, with regard to the out-of-band unwanted signal, the mixer output of the second mixer unit 104 and the mixer output of the first mixer unit 102 have opposite phases and are combined at the interconnection node N2. Therefore, one part and another part of the unwanted signal component present in the signal input S_IN are respectively down-converted by the first mixer unit 102 and the second mixer unit 104 using oscillation signals with opposite phases, and then summed to zero at the interconnection node N2. In this way, the signal output S_OUT has no down-converted unwanted signal component include therein. The desired blocker cancellation/suppression is achieved by the signal processing circuit 100. Please note that the frequency values mentioned above are for illustrative purposes only, and are not meant to be a limitation of the present invention. In practice, the capacitance value of the capacitor C1 should be adequately configured according to blocker cancellation/suppression requirement of the application that employs the signal processing circuit 100.

Briefly summarized, the second mixer unit 104 is introduced to a sub-path parallel to the main path at which the first mixer unit 102 is disposed and is used to provide a mixer output having a phase opposite to that of the mixer output of the first mixer unit 102, and the frequency-selective combining block 106 is provided for feeding the out-of-phase unwanted signal component (e.g., a purposely created OOB blocker signal having an opposite phase) back to the main path to reduce/cancel the unwanted signal component (e.g., an OOB blocker signal having an original phase) present at the main path. As the blocker current flowing to the following circuit stage is reduced/cancelled, the filter design of the following circuit stage is simplified and the hardware cost of the following circuit stage is reduced accordingly. For example, as the combination of the second mixer unit 104 and the frequency-selective combining block 106 absorb half of the blocker current and add it back to the main path with an opposite phase, the following circuit stage only needs to deal with very small blocker current, and the sizes of capacitors employed in the following circuit stage can be reduced to save the circuit area.

In one exemplary design, the sub-path mixer (i.e., the second mixer unit 104) and the main-phase mixer (i.e., the first mixer unit 102) may have the same size. In another exemplary design, the sub-path mixer and the main-phase mixer are allowed to have different sizes. For example, compared to the sub-path mixer (i.e., the second mixer unit 104), the main-phase mixer (i.e., the first mixer unit 102) may have a larger size, thereby reducing the impedance difference between the two paths at the blocker frequency and increasing the impedance difference of the two paths at the signal frequency. In this way, the blocker cancellation performance may be further improved.

The generalized circuit configuration shown in FIG. 1 is applicable to a wireless receiver application suffering from a high-side blocker signal (e.g., a blocker frequency of 20 MHz that is higher than the intermediate frequency of the wanted signal component). Besides, the generalized circuit configuration shown in FIG. 1 may also be applicable to a wireless receiver application suffering from a low-side blocker signal (e.g., a blocker frequency of −20 MHz that is lower than the intermediate frequency of the wanted signal component). No matter whether the signal processing circuit 100 is used for high-side blocker cancellation or low-side blocker cancellation, the IF capacitor (i.e., capacitor C1) is required to have a large capacitance value for acting as a short circuit at the blocker frequency, as shown in FIG. 3. To achieve the desired blocker cancellation without using large capacitor(s), one can employ the architecture shown in FIG. 4 for high-side blocker cancellation, and the architecture shown in FIG. 5 for low-side blocker cancellation. Principles and details of their operation are described in the following paragraphs.

Figure 4:
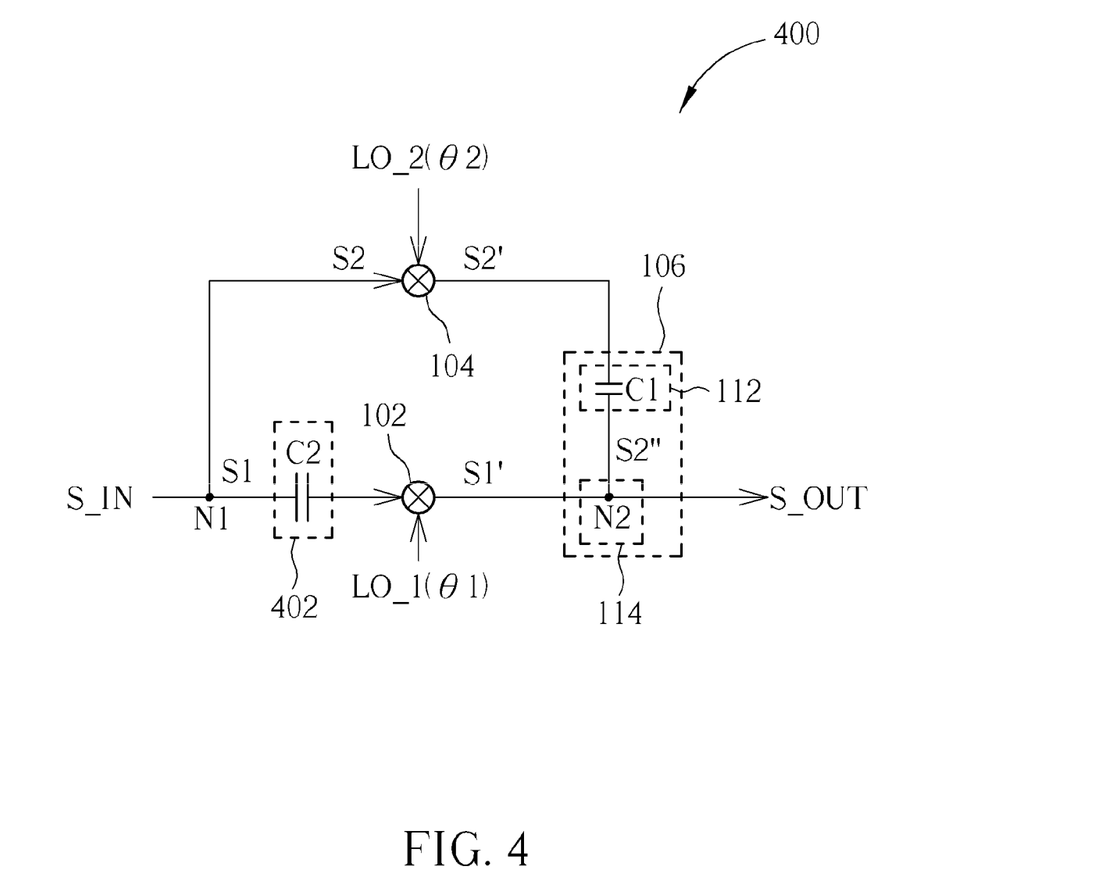
FIG. 4 is a diagram illustrating a signal processing circuit according to a second exemplary embodiment of the present invention.

FIG. 4 is a diagram illustrating a signal processing circuit according to a second exemplary embodiment of the present invention. The signal processing circuit 400 is dedicated to high-side blocker cancellation. The major difference between the signal processing circuits 100 and 400 is that the signal processing circuit 400 includes an additional capacitive component 402 that is implemented using a capacitor C2 acting as an AC-coupling capacitor for coupling the first signal S1 to the first mixer unit 102. As the mixer units 102 and 104 are just bidirectional switches, the impedance of capacitor C1 is transferred to the interconnection node N1 at the RF side. If capacitor C2 placed at the RF side is properly set to have the same impedance at the blocker frequency as the aforementioned impedance transferred from capacitor C1 at the blocker frequency, then the two paths, including the main path and the sub-path, in FIG. 4 have the same impedance when the out-of-band unwanted signal component looks into the interconnection node N1. Therefore, with proper setting of the capacitive components 402 and 112 (i.e., capacitors C1 and C2), the blocker current flowing through the main path and the blocker current flowing through the sub-path would be identical to each other due to the same impedance present at each of the main path and the sub-path. After being down-converted by the mixer unit 102 and 104, the blocker currents in the two paths have the same intensity but opposite phases. In this way, no net blocker current flows into the following circuit, resulting in the desired blocker cancellation.

Suppose that the current fed into the first mixer unit 102 is represented by $I_{RF1}$, the current fed into the second mixer unit 102 is represented by $I_{RF2}$, the current generated from the first mixer unit 102 is represented by $I_{BB1}$, the current generated from the second mixer unit 102 is represented by $I_{BB2}$, the equivalent impedance of the capacitive component 402 is represented by $Z_{C,RF}$, the equivalent impedance of the capacitive component 112 is represented by $Z_{C,BB}$, the equivalent resistance of each of the first mixer unit 102 and the second mixer unit 104 is represented by $R_{SW}$, the input impedance of the following circuit stage (e.g., a transimpedance amplifier) viewed by the signal processing circuit 400 is represented by $Z_{BB}$, the angular frequency of the local oscillation (LO) signal used by each of the first mixer unit 102 and the second mixer unit 104 is represented by $\omega_{LO}$, and the angular frequency difference between the LO signal and the blocker signal is represented by $\omega_m$. To achieve perfect blocker cancellation, the following equation must be satisfied.

$$\frac{I_{RF1}}{I_{RF2}} = \frac{R_{SW} + \frac{4}{\pi^2}Z_{BB}(j\omega_m) + \frac{2}{\pi^2}Z_{C,BB}(j\omega_m)}{R_{SW} + Z_{C,RF}(j(\omega_{LO} + \omega_m)) + \frac{4}{\pi^2}Z_{BB}(j\omega_m)} = 1 \quad (1)$$

Therefore, in accordance with above equation (1), the term $Z_{C,RF}(j(\omega_{LO}+\omega_m))$ should be equal to the term $$\frac{2}{\pi^2}Z_{C,BB}(j\omega_m)$$

to obtain $I_{RF1}=I_{RF2}$. In other words, the following equation should be satisfied $$Z_{C,RF}(j(\omega_{LO} + \omega_m)) \approx Z_{C,RF}(j\omega_{LO}) = \frac{2}{\pi^2}Z_{C,BB}(j\omega_m) \quad (2)$$

Thus, with proper sizing of the capacitive components 402 and 112 (i.e., capacitors C1 and C2) connected in a parallel fashion, the desired blocker cancellation for the positive-frequency OOB blocker signal can be realized without using large capacitance capacitors. That is, compared to the architecture in FIG. 1 that preferably requires the capacitor C1 having a large capacitance value to act as a short circuit under the blocker frequency, the architecture shown in FIG. 4 can achieve the desired blocker cancellation by using capacitors with smaller capacitance values.

Besides, as the capacitive components 402 and 112 are connected in a parallel fashion, the equivalent input impedance viewed by the preceding circuit stage at the RF side would be low to meet the requirement of the SAW-less receiver application. Moreover, the use of the AC-coupling capacitor C2 can also block the IM2 distortion from the preceding circuit stage (e.g., LNA) and avoid the DC current from flowing to the first mixer unit 102.

Figure 5:
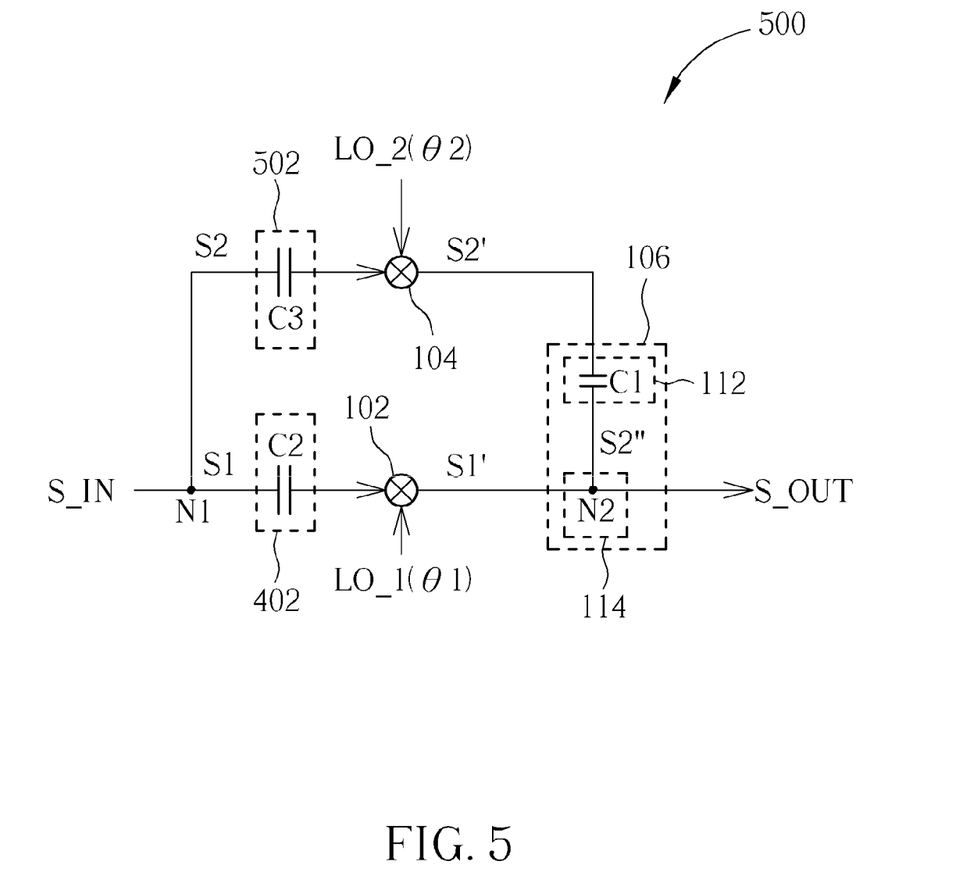
FIG. 5 is a diagram illustrating a signal processing circuit according to a third exemplary embodiment of the present invention.

FIG. 5 is a diagram illustrating a signal processing circuit according to a third exemplary embodiment of the present invention. The signal processing circuit 500 is dedicated to low-side blocker cancellation. The reason why we have a different hardware implementation for low-side blocker cancellation is that the equivalent impedance of the capacitor C1 at the RF side under the negative-frequency OOB blocker signal is different from the equivalent impedance of the capacitor C1 at the RF side under the positive-frequency OOB blocker signal. The impedance of capacitor C2 in FIG. 4, however, is almost fixed for high-side and low-side blocker signals because both blocker frequencies are so close to the LO frequency. Therefore, to make the two paths have equal impedance when viewed at the RF side, another capacitor is added to the sub-path as shown in FIG. 5. The signal processing circuit 500 includes a capacitive component 502 implemented using a capacitor C3 acting as an AC-coupling capacitor for coupling the second signal S2 to the second mixer unit 104. The capacitor C3 with a properly set capacitive value makes the blocker current flowing through the sub-path identical to the blocker current flowing through the main path, resulting in no net blocker current flowing into the following circuit. Compared with the architecture in FIG. 1 that preferably requires the capacitor C1 having a large capacitance value to act as a short circuit under the blocker frequency, the architecture shown in FIG. 5 can achieve the desired blocker cancellation by using capacitors with smaller capacitance values. In addition, the equivalent input impedance viewed by the preceding circuit stage (e.g., LNA) is still low to meet the requirement of the SAW-less receiver application. Moreover, the use of the AC-coupling capacitors C2 and C3 can also block the IM2 distortion from the preceding circuit stage (e.g., LNA) and avoid the DC current from flowing to the first mixer unit 102 and the second mixer unit 104.

In a case where only positive-frequency OOB blocker signal exists or a target application only suffers from the positive-frequency OOB blocker signal, the target application may only have the signal processing circuit 100/400 employed therein for high-side blocker cancellation. In another case where only negative-frequency OOB blocker signal exists or a target application only suffers from the negative-frequency OOB blocker signal, the target application may only have the signal processing circuit 100/500 employed therein for low-side blocker cancellation. However, when there are positive-frequency and negative-frequency OOB blocker signals or a target application (e.g., a SAW-less receiver application) suffers from either of the positive-frequency and negative-frequency OOB blocker signals, the target application has to properly switch between the high-side blocker cancellation scheme and low-side blocker cancellation scheme for achieving optimal signal quality.

Figure 6:
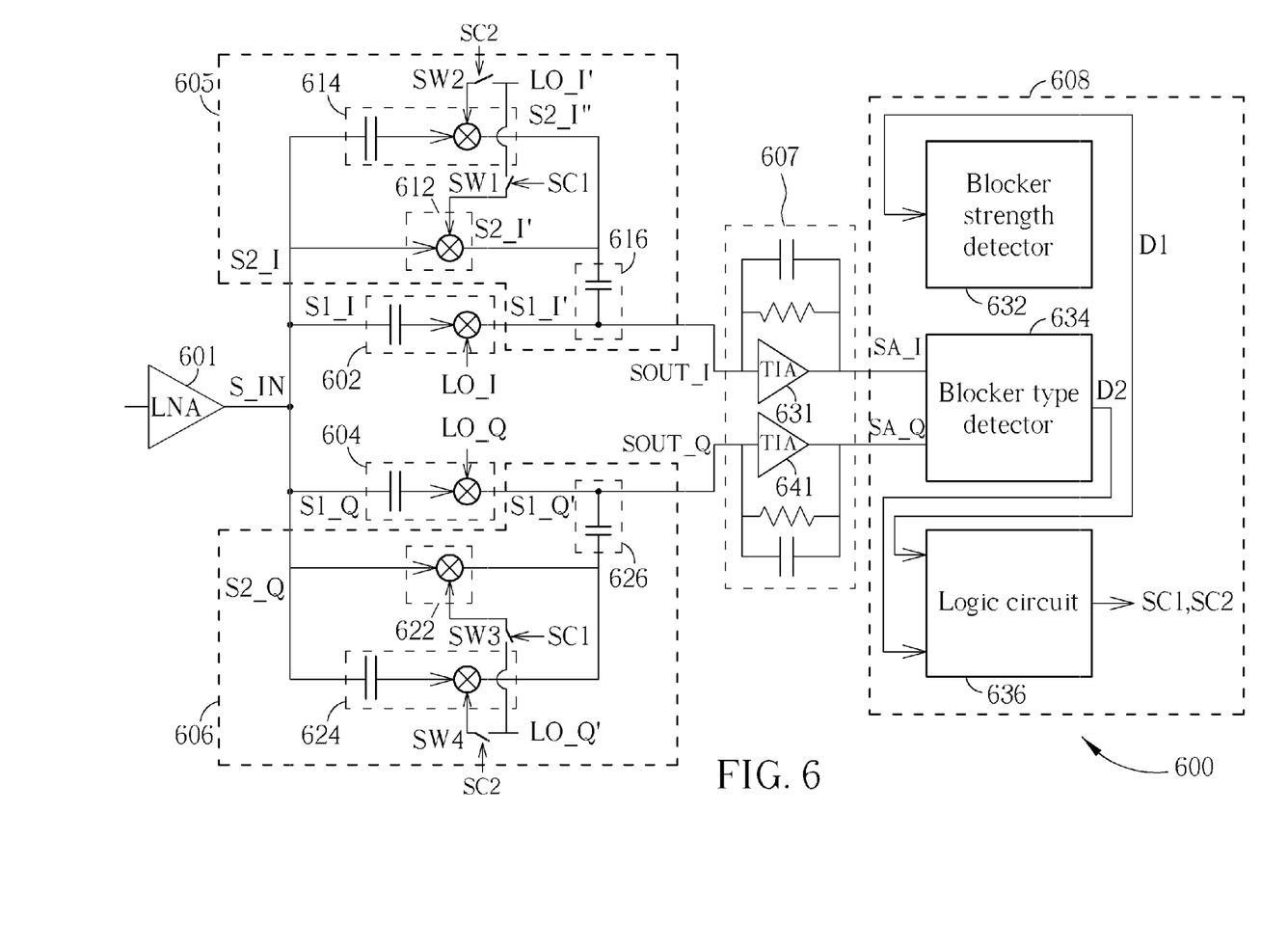
FIG. 6 is a diagram illustrating a signal processing circuit according to a fourth exemplary embodiment of the present invention.

Please refer to FIG. 6, which is a diagram illustrating a signal processing circuit according to a fourth exemplary embodiment of the present invention. The signal processing circuit 600 includes, but is not limited to, a low-noise amplifier (LNA) 601, a plurality of first mixer circuits 602, 604, a plurality of blocker cancellation blocks 605, 606, an amplifier circuit 607, and a blocker detection block 608. In this exemplary embodiment, the LNA 601 is part of a SAW-less RF front-end. In other words, the signal input S_IN is derived from a radio-frequency signal provided by the SAW-less RF front-end. The first mixer circuit 602 is disposed at the in-phase main path, and arranged for generating a first mixing output S1_I' according to a first input S1_I. Regarding the other first mixer circuit 604, it is disposed at the quadrature main path, and arranged for generating a first mixing output S1_Q' according to a first input S1_Q. The first input S1_I and the first input S1_Q may be derived from the same signal input S_IN due to signal splitting. The blocker detection block 608 is arranged for detecting characteristics of a blocker signal to generate a control output.

In this exemplary embodiment, the control output may include a plurality of switch control signals SC1 and SC2 used to control switching between different candidate blocker cancellation configurations supported by the blocker cancellation block 605/606. Specifically, regarding the blocker cancellation block 605 for the in-phase channel, it is arranged to support multiple candidate blocker cancellation configurations used to apply different blocker cancellations to the first mixing output S1_I', and employ one of the candidate blocker cancellation configurations according to the control output. Regarding the other blocker cancellation block 606 for the quadrature channel, it is arranged to support multiple candidate blocker cancellation configurations used to apply different blocker cancellations to the first mixing output S1_Q', and employ one of the candidate blocker cancellation configurations according to the control output.

As shown in FIG. 6, the blocker cancellation block 605 includes a second mixer circuit 612, a third mixer circuit 614, a frequency-selective combining block 616, and a plurality of switches SW1, SW2, wherein the switches SW1 and SW2 are controlled by the switch control signals SC1 and SC2, respectively. The second mixer circuit 612 is arranged for generating a second mixing output S2_I' according to a second signal S2_I when the blocker cancellation block 605 employs a first candidate blocker cancellation configuration (e.g., the aforementioned high-side block cancellation scheme). The third mixer circuit 614 is arranged for generating a third mixing output S2_I" according to the second signal S2_I when the blocker cancellation block 605 employs the second candidate blocker cancellation configuration (e.g., the aforementioned low-side blocker cancellation scheme). As shown in FIG. 6, the switch SW1 determines whether the local oscillation signal LO_I' is supplied to a mixer unit in the second mixer circuit 612, and the switch SW2 determines whether the local oscillation signal LO_I' is supplied to a mixer unit in the third mixer circuit 614. Therefore, the second mixer circuit 612 is enabled for high-side blocker cancellation when the switch SW1 is switched on by the control signal SC1, and the third mixer circuit 614 is enabled for low-side blocker cancellation when the switch SW2 is switched on by the control signal SC2. More specifically, the control signal SC1 controls enabling of the high-side blocker cancellation, while the other control signal SC2 controls enabling of the low-side blocker cancellation.

In this exemplary embodiment, the frequency-selective combining block 616 may be implemented using the aforementioned frequency-selective combining block 106, the first mixer circuit 602 may be implemented using the aforementioned first mixer unit 102 and the capacitive component 402 shown in FIG. 4, the second mixer circuit 612 may be implemented using the aforementioned second mixer unit 104 shown in FIG. 4, and the third mixer circuit 614 may be implemented using the aforementioned second mixer unit 104 and capacitive component 502 shown in FIG. 5. The mixer unit of the first mixer circuit 602 receives a local oscillation signal LO_I for performing its designated down-conversion functionality, and each of the mixer units of the second mixer circuit 612 and the third mixer circuit 614 receives the local oscillation signal LO_I' for performing its designated down-conversion functionality, where the local oscillation signals LO_I acts as an in-phase local oscillation signal, the local oscillation signals LO_I and LO_I' have the same frequency, and there is a 180-degree phase difference between the local oscillation signals LO_I and LO_I'.

Similarly, the blocker cancellation block 606 includes a second mixer circuit 622, a third mixer circuit 624, a frequency-selective combining block 626, and a plurality of switches SW3, SW4, wherein the switches SW3 and SW4 are controlled by the switch control signals SC1 and SC2, respectively. In this exemplary embodiment, the mixer unit of the first mixer circuit 604 receives a local oscillation signal LO_Q for normal operation, and the mixer units of the second mixer circuit 622 and the third mixer circuit 624 receive a local oscillation signal LO_Q' for normal operation. The local oscillation signal LO_Q acts as a quadrature local oscillation signal such that the local oscillation signals LO_I and LO_Q have the same frequency and there is a 90-degree phase difference between the local oscillation signals LO_I and LO_Q; besides, the local oscillation signals LO_Q and LO_Q' have the same frequency, and there is a 180-degree phase difference between the local oscillation signals LO_Q and LO_Q'. As the circuit configuration and function of the first mixer circuit 604 and blocker cancellation block 606 are identical to that of the first mixer circuit 602 and blocker cancellation block 605, further description is omitted here for brevity.

As shown in FIG. 6, an in-phase signal output S_OUT_I is derived from the first mixing output S1_I' at the in-phase main path, and a quadrature signal output S_OUT_Q is derived from the first mixing output S1_Q' at the quadrature main path. The amplifier circuit 607 is arranged to process IF outputs including in-phase signal output S_OUT_I and quadrature signal output S_OUT_Q, and includes two transimpedance amplifiers (TIAs) 631, 641 used for generating an in-phase amplifier output SA_I according to the first mixing output S_OUT_I and generating an quadrature amplifier output SA_Q according to the first mixing output S_OUT_Q, respectively. By way of example, but not limitation, one of the in-phase amplifier output SA_I and the quadrature amplifier output SA_Q may be used for blocker strength detection, and/or both of the in-phase amplifier output SA_I and the quadrature amplifier output SA_Q may be used for blocker type detection.

In this exemplary embodiment, the blocker detection block 608 includes a blocker strength detector 632, a blocker type detector 634, and a logic circuit 636. Regarding the blocker strength detector 632, it is arranged for detecting strength/amplitude of the detected blocker signal and generating a blocker strength detection result D1. Please refer to FIG. 7, which is a diagram illustrating an exemplary implementation of the blocker strength detector 632 shown in FIG. 6. The blocker strength detector 632 includes a high-pass filter (HPF) 702 and a comparator 704. The HPF 702 is arranged for generating a filtered signal SF according to the in-phase amplifier output SA_I. More specifically, the HPF 702 is used to reject the low-frequency wanted signal and blocker signal (i.e., the in-band blocker signal) so that the blocker strength detection only performs upon the OOB blocker signal. Assuming that the OOB blocker frequency is 20 MHz, the HPF 702 may be formed by a resistor with a resistance value of 8 kΩ and a capacitor with a capacitance value of 1 pF to have a cutoff frequency located at 20 MHz, which results in a minor impact on the circuit area.

Figure 7:
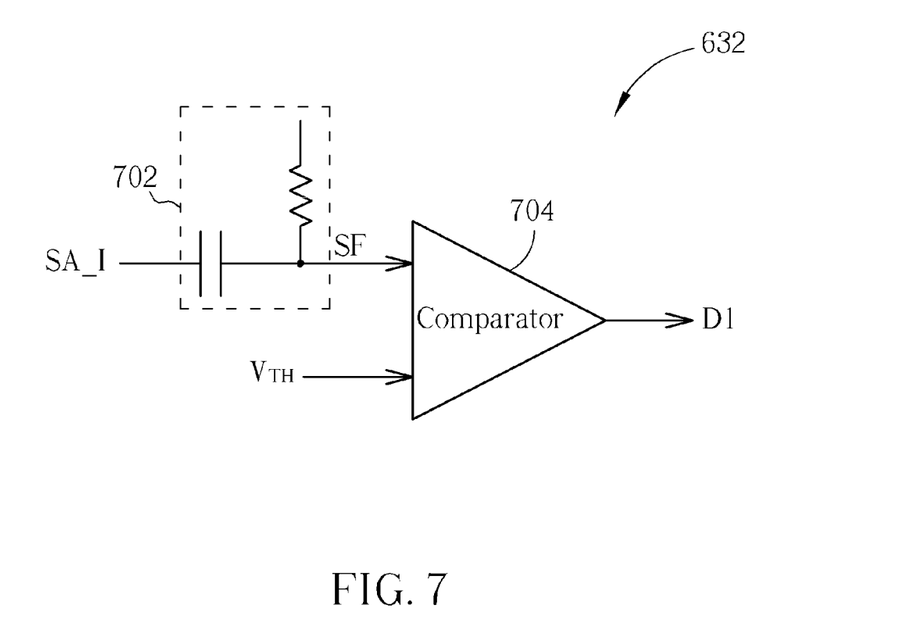
FIG. 7 is a diagram illustrating an exemplary implementation of a blocker strength detector shown in FIG. 6.

The comparator 704 is arranged for receiving the filtered signal SF and a predetermined threshold level $V_{TH}$, and comparing the filtered signal SF with the predetermined threshold level $V_{TH}$ to generate the blocker strength detection result D1. As the presence of the OOB blocker signal would make the filtered signal SF have large strength/amplitude, the comparator 704 checks if the strength/amplitude of the filtered signal SF is greater than the predetermined threshold level $V_{TH}$, and generates the blocker strength detection result D1 to indicate the strength of the OOB blocker signal accordingly. For example, when the blocker strength detection result D1 has a logic high level "1", this implies that the strength/amplitude of the filtered signal SF is greater than the predetermined threshold level $V_{TH}$, and a proper blocker cancellation scheme should be enabled at this moment for reducing or cancelling the undesired OOB blocker signal. When the blocker strength detection result D1 has a logic low level "0", this implies that the strength/amplitude of the filtered signal SF is not greater than the predetermined threshold level $V_{TH}$, and there is no need to enable a blocker cancellation scheme at this moment. Please note that the predetermined threshold level $V_{TH}$ should be properly set; otherwise, the signal quality would be greatly degraded by the blocker interference. For example, the predetermined threshold level $V_{TH}$ may be set by a low voltage value to therefore ensure that the blocker cancellation scheme is enabled each time the wanted signal is interfered with the unwanted blocker signal.

Regarding the blocker type detector 634, it is arranged for detecting whether the detected blocker signal is a high-side blocker or a low-side blocker, and generating a blocker type detection result D2. By way of example, the blocker type detector 634 may generate the blocker type detection result D2 by monitoring a phase relation between an in-phase signal and a quadrature signal. Please refer to FIG. 8, which is a diagram illustrating an exemplary implementation of the blocker type detector 634 shown in FIG. 6. The blocker type detector 634 includes a first HPF 802, a second HPF 804, two inverter chains 803, 805 each having a plurality inverters 808, and a flip-flip 806. The first HPF 802 is arranged for generating an in-phase filtered signal SF_I according to an in-phase amplifier output SA_I. The second HPF 804 is arranged for generating a quadrature filtered signal SF_Q according to a quadrature amplifier output SA_Q. More specifically, each of the high-pass filters 802 and 804 is used to reject the low-frequency wanted signal and blocker signal (i.e., the in-band blocker signal) so that the blocker type detection only performs upon the OOB blocker signal. Assuming that the OOB blocker frequency is 20 MHz, each of the high-pass filters 802 and 804 may be formed by a resistor with a resistance value of 8 kΩ and a capacitor with a capacitance value of 1 pF to have a cutoff frequency located at 20 MHz, which results in a minor impact on the circuit area.

Figure 8:
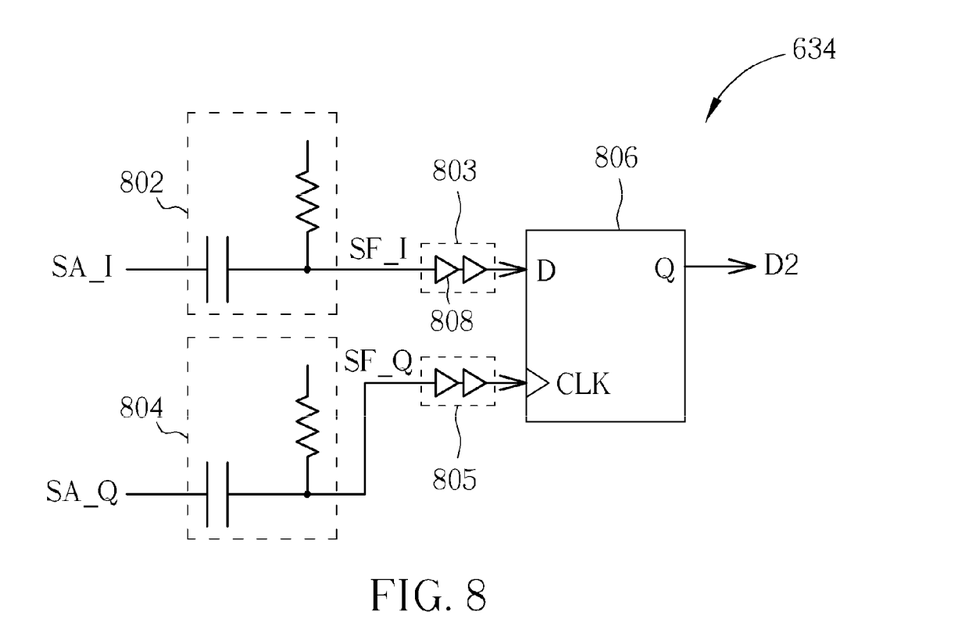
FIG. 8 is a diagram illustrating an exemplary implementation of a blocker type detector shown in FIG. 6.

The flip-flip 806 may be a D-type flip-flop (DFF) having a data input port D, a clock input port CLK, and a data output port Q. As DFF is a digital circuit element, the inverters 808 disposed after the high-pass filters 802 and 804 are therefore used to make the amplitude of each of the in-phase amplifier output SA_I and quadrature amplifier output SA_Q have a full swing between a low logic level "0" and a high logic level "1". It should be noted that the number of inverters implemented in each of the inverter chains 803, 805 shown in FIG. 8 is for illustrative purposes only, and is not meant to be a limitation of the present invention. Besides, the inverter chains 803 and 805 may be optional. Considering a case where a preceding circuit stage (e.g., the amplifier circuit 607) is properly designed to ensure that the amplitude of each of the in-phase amplifier output SA_I and quadrature amplifier output SA_Q has a full swing between a low logic level and a high logic level, the inverter chains 803 and 805 may be omitted.

As shown in FIG. 8, the data input port D is coupled to the in-phase filtered signal SF_I via the inverter chain 803, the clock input port CLK is coupled to the quadrature filtered signal SF_Q via the inverter chain 805, and the data output port Q is arranged for outputting the blocker type detection result D2. More specifically, in this exemplary embodiment, the in-phase filtered signal SF_I would be sampled by the quadrature filtered signal SF_Q. When the OOB blocker signal is a high-side blocker with a positive-frequency blocker frequency, the phase of the in-phase signal would lead that of the quadrature signal. However, when the OOB blocker signal is a low-side blocker with a negative blocker frequency, the phase of the quadrature signal would lead that of the in-phase signal. Based on such an observation, the blocker type detection result D2 is set by a logic high level "1" if a sampled value has a logic high level "1" due to the phase of the in-phase signal leading that of the quadrature signal, and the blocker type detection result D2 is set by a logic low level "0" if a sampled value has a logic low level "0" due to the phase of the quadrature signal leading that of the in-phase signal. Therefore, the blocker type detection result D2 indicates whether the OOB blocker signal is a high-side blocker or a low-side blocker.

It should be noted that the circuit configuration shown in FIG. 8 is for illustrative purposes only. In another exemplary embodiment, the data input port D may be configured to receive the quadrature filtered signal SF_Q via the inverter chain 805, the clock input port CLK may be configured to receive the in-phase filtered signal SF_I via the inverter chain 803, and the data output port Q is still arranged for outputting the blocker type detection result D2. Therefore, if a sampled value has a logic low level "0" due to the phase of the in-phase signal leading that of the quadrature signal, the blocker type detection result D2 is configured to use a logic low level "0" to indicate that the OOB blocker signal is a high-side blocker; and if a sampled value has a logic high level "1" due to the phase of the quadrature signal leading that of the in-phase signal, the blocker type detection result D2 is configured to use a logic high level "1" to indicate that the OOB blocker signal is a high-low blocker. The same objective of detecting and indicating the blocker type is achieved.

Please refer to FIG. 6 again. The logic circuit 636 is arranged for receiving the blocker strength detection result D1 and the blocker type detection result D2, and generating the control output (e.g., the switch control signals SC1 and SC2) according to the blocker strength detection result D1 and the blocker type detection result D2.

In one exemplary design, the high-side blocker cancellation scheme and the low-side blocker cancellation scheme are initially disabled when the blocker detection block 608 is initially enabled. That is, all of the switches SW1-SW4 are initially switched off. If the blocker strength detection result D1 indicates that the detected blocker signal does not have the strength/amplitude exceeding the predetermined threshold level, the logic circuit 636 sets the switch control signals SC1 and SC2 to keep the switches SW1-SW4 switched off, regardless of the blocker type detection result D2. If the blocker strength detection result D1 indicates that the detected blocker signal has the amplitude exceeding the predetermined threshold level, the logic circuit 636 refers to the blocker type detection result D2 to decide how to set the switch control signals SC1 and SC2. For example, if the blocker type detection result D2 indicates that the detected blocker signal is a high-side blocker, the switch control signal SC2 is set to keep the switches SW2 and SW4 switched off and the switch control signal SC1 is set to make the switches SW1 and SW3 switched on. In this way, the high-side blocker cancellation scheme is enabled accordingly. If the blocker type detection result D2 indicates that the detected blocker signal is a low-side blocker, the switch control signal SC2 is set to make the switches SW2 and SW4 switched on and the switch control signal SC1 is set to keep the switches SW1 and SW3 switched off. In this way, the low-side blocker cancellation scheme is enabled accordingly.

In another exemplary design, the low-side blocker cancellation scheme may be initially enabled when the blocker detection block 608 is initially enabled. That is, the switches SW2 and SW4 are initially switched on, and the remaining switches SW1 and SW3 are initially switched off. As the low-side blocker cancellation scheme is initially enabled while the blocker strength detector 632 is initially detecting if the strength/amplitude of the detected blocker signal exceeds a predetermined threshold level, some unwanted signal components may be filtered out beforehand. Hence, compared to above-mentioned exemplary design with the high-side blocker cancellation scheme and the low-side blocker cancellation scheme initially disabled, the exemplary design with the low-side blocker cancellation scheme initially enabled can set the predetermined threshold level (e.g., $V_{TH}$) by a higher voltage value to avoid the high-side blocker cancellation scheme from being easily or erroneously enabled. To put it another way, the default setting of the blocker cancellation block 605/606 is keeping the low-side blocker cancellation scheme active. The discrepancy between the frequency response of the low-side blocker signal and the frequency response of the high-side blocker signal provided by the low-side blocker cancellation scheme is less than the discrepancy between the frequency response of the low-side blocker signal and the frequency response of the high-side blocker signal provided by the high-side blocker cancellation scheme. Hence, the low-side blocker cancellation scheme is selected to be enabled by the default setting without significantly degrading the performance of the SAW-less receiver due to smaller input impedance variation.

If the blocker strength detection result D1 indicates that the detected blocker signal does not have the strength/amplitude exceeding the predetermined threshold level, the logic circuit 636 directly sets the switch control signals SC1 and SC2 to keep the switches SW2 and SW4 switched on and switches SW1 and SW3 switched off, regardless of the blocker type detection result D2. If the blocker strength detection result D1 indicates that the detected blocker signal has the strength/amplitude exceeding the predetermined threshold level, the logic circuit 636 refers to the blocker type detection result D2 to decide how to set the switch control signals SC1 and SC2. For example, if the blocker type detection result D2 indicates that the detected blocker signal is a high-side blocker, the switch control signal SC2 is set to make the switches SW2 and SW4 switched off and the switch control signal SC1 is set to make the switches SW1 and SW3 switched on. In this way, the high-side blocker cancellation scheme is enabled accordingly. If the blocker type detection result D2 indicates that the detected blocker signal is a low-side blocker, the switch control signal SC2 is set to keep the switches SW2 and SW4 switched on and the switch control signal SC1 is set to keep the switches SW1 and SW3 switched off. In this way, the low-side blocker cancellation scheme remains enabled.

In the embodiment shown in FIG. 6, the blocker detection block 608 operates according to output(s) of the amplifier circuit 607. However, this is for illustrative purposes only. In an alternative design, the blocker detection block 608 may be modified to generate the control output by referring to other signal(s) for detecting characteristics of a blocker signal. In other words, the spirit of the present invention is obeyed as long as the control output used for switching the blocker cancellation block between different blocker cancellation configurations is derived from a detection result of a blocker signal.

Moreover, in addition to the single-ended architecture, the proposed signal processing circuit may be employed in a differential architecture. For example, with a proper modification made to the signal processing circuit 600 shown in FIG. 6, the modified signal processing circuit 600 may be used in a SAW-less receiver for applying proper blocker cancellation to a positive in-phase path, a negative in-phase path, a positive quadrature path, and a negative quadrature path.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing circuit for generating a signal output by processing a signal input, comprising:
   a first mixer unit, arranged for receiving a first signal and a first oscillation signal, and generating a first mixing output by mixing the first oscillation signal and the first signal;
   a second mixer unit, arranged for receiving a second signal and a second oscillation signal, and generating a second mixing output by mixing the second oscillation signal and the second signal, wherein each of the first signal and the second signal is part of the signal input, and the first oscillation signal and the second oscillation signal have a same frequency but different phases; and
   a frequency-selective combining block, arranged for frequency-selectively combining the first mixing output and the second mixing output to generate the signal output.

2. The signal processing circuit of claim 1, wherein the first oscillation signal and the second oscillation signal have a 180-degree phase difference therebetween.

3. The signal processing circuit of claim 1, wherein the frequency-selective combining block comprises:
   a first capacitive component, arranged for generating a frequency-selective output according to the second mixing output; and
   a combining unit, arranged for combining the frequency-selective output and the first mixing output to generate the signal output.

4. The signal processing circuit of claim 3, further comprising:
   a second capacitive component, arranged for coupling the first signal to the first mixer unit.

5. The signal processing circuit of claim 4, further comprising:
   a third capacitive component, arranged for coupling the second signal to the second mixer unit.

6. The signal processing circuit of claim 1, wherein the signal input is a radio-frequency signal.

7. The signal processing circuit of claim 6, wherein the radio-frequency signal is provided by a radio-frequency front-end of a SAW-less receiver.

8. A signal processing method for generating a signal output by processing a signal input, comprising:
   splitting the signal input to obtain a first signal and a second signal simultaneously;
   applying a first mixing operation to the first signal to generate a first mixing output;
   applying a second mixing operation to the second signal to generate a second mixing output, wherein the first mixing operation is different from the second mixing operation, and the first mixing output and the second mixing output have different phases; and
   frequency-selectively combining the first mixing output and the second mixing output to generate the signal output.

9. The signal processing method of claim 8, wherein the first mixing output and the second mixing output have a 180-degree phase difference therebetween.

10. The signal processing method of claim 8, wherein the step of frequency-selectively combining the first mixing output and the second mixing output comprises:
    generating a frequency-selective output according to the second mixing output, wherein a first signal component having a first frequency in the second mixing output is allowed to be present in the frequency-selective output, a second signal component having a second frequency in the second mixing output is not allowed to be present in the frequency-selective output, and the first frequency is different from the second frequency; and
    combining the frequency-selective output and the first mixing output to generate the signal output.

11. The signal processing method of claim 10, wherein the first frequency is higher than the second frequency.

12. The signal processing method of claim 8, wherein the signal input is a radio-frequency signal.

13. The signal processing method of claim 12, further comprising:
    receiving the radio-frequency signal from a radio-frequency front-end of a SAW-less receiver.

14. A signal processing circuit, comprising:
    a first mixer circuit, arranged for generating a first mixing output according to a first input; and
    a blocker detection block, arranged for detecting characteristics of a blocker signal to generate a control output; and
    a blocker cancellation block, arranged to support a plurality of candidate blocker cancellation configurations used to apply different blocker cancellations to the first mixing output, and employ one of the candidate blocker cancellation configurations according to the control output, wherein the blocker cancellation block comprises a plurality of distinct circuits corresponding to the candidate blocker cancellation configurations, respectively, and the distinct circuits are not enabled simultaneously.

15. The signal processing circuit of claim 14, wherein the candidate blocker cancellation configurations include a first candidate blocker cancellation configuration and a second candidate blocker cancellation configuration, and the blocker cancellation block comprises:
    a second mixer circuit, arranged for generating a second mixing output according to a second signal when the blocker cancellation block employs the first candidate blocker cancellation configuration;
    a third mixer circuit, arranged for generating a third mixing output according to the second signal when the blocker cancellation block employs the second candidate blocker cancellation configuration, wherein the second mixer circuit and the third mixer circuit are arranged to perform different mixing operations, and each of the first signal and the second signal is part of the signal input; and
    a frequency-selective combining block, arranged for frequency-selectively combining the first mixing output and one of the second and third mixing outputs to generate a signal output.

16. The signal processing circuit of claim 15, wherein:
    the frequency-selective combining block comprises:
       a first capacitive component, arranged for generating a frequency-selective output according to one of the second and third mixing outputs; and
       a combining unit, arranged for combining the frequency-selective output and the first mixing output to generate the signal output;
    the first mixer circuit comprises:
       a first mixer unit, arranged for generating the first mixing output by mixing the first signal and a first oscillation signal; and
       a second capacitive component, arranged for coupling the first signal to the first mixer unit;
    the second mixer circuit comprises:
       a second mixer unit, arranged for directly receiving the second signal, and generating the second mixing output by mixing the second signal and a second oscillation signal when receiving the second oscillation signal, wherein the first oscillation signal and the second oscillation signal have a same frequency but different phases; and the third mixer circuit comprises:
a third mixer unit, arranged for generating the third mixing output by mixing the second signal and the second oscillation signal when receiving the second oscillation signal; and
a third capacitive component, arranged for coupling the second signal to the third mixer unit.

17. The signal processing circuit of claim 16, wherein the first oscillation signal and the second oscillation signal have a 180-degree phase difference therebetween.

18. The signal processing circuit of claim 16, wherein the blocker cancellation block initially employs the second candidate blocker cancellation configuration while the blocker detection block is initially detecting characteristics of the blocker signal.

19. The signal processing circuit of claim 14, wherein the first signal is derived from a radio-frequency signal provided by a radio-frequency front-end of a SAW-less receiver.

20. A signal processing circuit, comprising:
a first mixer circuit, arranged for generating a first mixing output according to a first input; and
a blocker detection block, arranged for detecting characteristics of a blocker signal to generate a control output and
a blocker cancellation block, arranged to support a plurality of candidate blocker cancellation configurations used to apply different blocker cancellations to the first mixing output, and employ one of the candidate blocker cancellation configurations according to the control output;
wherein the blocker detection block comprises:
a blocker type detector, arranged for detecting whether the detected blocker signal is a high-side blocker or a low-side blocker, and generating a blocker type detection result, wherein the control output is set according to at least the blocker type detection result.

21. The signal processing circuit of claim 20, wherein the blocker type detector monitors a phase relation between an in-phase signal and a quadrature signal, and generates the blocker type detection result according to the monitored phase relation.

22. The signal processing circuit of claim 21, further comprising:
an amplifier circuit, arranged for generating an amplifier output according to the first mixing output, wherein one of the in-phase signal and the quadrature signal processed by the blocker type detector is the amplifier output.

23. The signal processing circuit of claim 20, wherein the blocker type detector comprises:
a first high-pass filter, arranged for generating an in-phase filtered signal according to an in-phase signal;
a second high-pass filter, arranged for generating a quadrature filtered signal according to a quadrature signal; and
a flip-flop, having a data input port coupled to one of the in-phase filtered signal and the quadrature filtered signal, a clock input port coupled to the other of the in-phase filtered signal and the quadrature filtered signal, and a data output port arranged for outputting the blocker type detection result.

24. The signal processing circuit of claim 23, further comprising:
an amplifier circuit, arranged for generating an amplifier output according to the first mixing output, wherein one of the in-phase signal and the quadrature signal processed by the blocker type detector is the amplifier output.

25. The signal processing circuit of claim 23, wherein the blocker type detector comprises:
a first inverter chain, coupled between the first high-pass filter and the flip-flop; and
a second inverter chain, coupled between the second high-pass filter and the flip-flop.

26. The signal processing circuit of claim 20, wherein the blocker detection block further comprises:
a blocker strength detector, arranged for detecting strength of the detected blocker signal and generating a blocker strength detection result; and
a logic circuit, arranged for receiving the blocker strength detection result and blocker type detection result, and generating the control output according to the blocker strength detection result and the blocker type detection result.

27. The signal processing circuit of claim 26, wherein the blocker strength detector comprises:
a high-pass filter, arranged for generating a filtered signal according to a received signal; and
a comparator, arranged for receiving the filtered signal and a predetermined threshold level, and comparing the filtered signal with the predetermined threshold level to generate the blocker strength detection result.

28. The signal processing circuit of claim 27, further comprising:
an amplifier circuit, arranged for generating an amplifier output according to the first mixing output, wherein the received signal processed by the blocker strength detector is the amplifier output.

* * * * *